US011425771B2

(12) United States Patent
Majmundar et al.

(10) Patent No.: US 11,425,771 B2
(45) Date of Patent: Aug. 23, 2022

(54) MEDIUM ACCESS CONTROL INTERFACE TO COORDINATE MULTI-SITE OPERATION FOR 5G OR OTHER NEXT GENERATION WIRELESS NETWORK

(71) Applicant: AT&T Intellectual Property I, L.P., Atlanta, GA (US)

(72) Inventors: Milap Majmundar, Austin, TX (US); Thomas Novlan, Cedar Park, TX (US); Salam Akoum, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/089,405

(22) Filed: Nov. 4, 2020

(65) Prior Publication Data
US 2021/0160940 A1 May 27, 2021

Related U.S. Application Data

(60) Provisional application No. 62/941,658, filed on Nov. 27, 2019.

(51) Int. Cl.
*H04W 76/15* (2018.01)
*H04W 24/08* (2009.01)
(Continued)

(52) U.S. Cl.
CPC .......... *H04W 76/15* (2018.02); *H04W 24/08* (2013.01); *H04W 80/02* (2013.01); *H04W 92/10* (2013.01)

(58) Field of Classification Search
CPC ..... H04W 80/92; H04W 80/02; H04W 76/15; H04W 76/11; H04W 28/18; H04W 40/22; H04W 24/02
See application file for complete search history.

(56) References Cited

U.S. PATENT DOCUMENTS 10,601,721 B2 * 3/2020 Goel .................. H04L 47/283
10,972,400 B2 * 4/2021 Goel .................. H04L 47/283
(Continued)

FOREIGN PATENT DOCUMENTS

EP   3301964 A2 * 4/2018 ........... H04W 24/02
EP   3734858 A1 * 11/2020 ........... H04W 40/22
(Continued)

OTHER PUBLICATIONS

Y. Ren, S. He, P. Hu and J. Sun, "Research on Cross-Layer Optimization of Smart Grid Demand Side Based on WSNs," 2018 IEEE International Conference on Software Quality, Reliability and Security Companion (QRS-C), 2018, pp. 414-420, doi: 10.1109/QRS-C. Aug. 2018.00078. (Year: 2018).*

(Continued)

*Primary Examiner* — William D Cumming
(74) *Attorney, Agent, or Firm* — Amin, Turocy & Watson, LLP

(57) ABSTRACT

A system that facilitates monitoring communication between a network node device and a communication device, wherein information is communicated by utilizing a first distribution unit (DU) node device comprising a first medium access control (MAC) layer component of the network node device and receiving condition information representative of a condition, wherein the condition indicates whether to add a second DU node device comprising a second MAC layer component to be utilized by the communication device. In response to determining that the condition indicates addition of the second DU node device, facilitating establishing a connection between the first MAC layer component of the first DU node device and the second MAC layer component of the second DU node device using a MAC interface and facilitating communication of control plane information and user plane information between the (Continued)

first MAC layer component and the second MAC layer component using the MAC interface.

20 Claims, 9 Drawing Sheets

(51) Int. Cl.
*H04W 80/02* (2009.01)
*H04W 92/10* (2009.01)

(56) References Cited

U.S. PATENT DOCUMENTS

| | | | |
|---|---|---|---|
| 2017/0126574 A1* | 5/2017 | Goel | H04L 43/0882 |
| 2018/0184332 A1* | 6/2018 | Dai | H04W 24/10 |
| 2020/0344843 A1* | 10/2020 | Zhu | H04W 40/22 |
| 2021/0160940 A1* | 5/2021 | Majmundar | H04W 76/15 |
| 2021/0211224 A1* | 7/2021 | Hu | H04L 1/0025 |

FOREIGN PATENT DOCUMENTS

| | | | | |
|---|---|---|---|---|
| KR | 20200106938 A | * | 9/2020 | H04W 80/02 |
| WO | WO-2019035434 A1 | * | 2/2019 | H04W 16/26 |
| WO | WO-2019137504 A1 | * | 7/2019 | H04W 80/02 |

OTHER PUBLICATIONS

G. I. E. Cancelo, J. M. Catalfo and M. A. Mayosky, "A VME based MAP node running under OS9 operating system," in IEEE Transactions on Nuclear Science, vol. 36, No. 5, pp. 1612-1615, Oct. 1989, doi: 10.1109/23.41114. (Year: 1989).*

* cited by examiner

MEDIUM ACCESS CONTROL INTERFACE TO COORDINATE MULTI-SITE OPERATION FOR 5G OR OTHER NEXT GENERATION WIRELESS NETWORK

RELATED APPLICATION

The subject patent application claims priority to U.S. Provisional Patent Application No. 62/941,658, filed Nov. 27, 2019, and entitled "MEDIUM ACCESS CONTROL INTERFACE TO COORDINATE MULTI-SITE OPERATION FOR 5G OR OTHER NEXT GENERATION WIRELESS NETWORK", the entirety of which application is hereby incorporated by reference herein.

TECHNICAL FIELD

This disclosure relates generally to interface between medium access control layers of network node devices in wireless communication system. More specifically, facilitating establishing a medium access control interface to coordinate communication between distribution units, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. Currently, wireless specifications define various features such as multiple transmission and reception point (multi-TRP) enhancements, and carrier aggregation/dual connectivity (CA/DC) enhancements. For example, carrier aggregation (CA) across different component carriers could be supported across two different non-co-located network node devices (e.g., gNB or gNodeB) or gNB-distributed units (gNB-DU). Also, a user equipment (UE) could receive different spatial layers on the same component carrier from two non-co-located transmission and reception points (TRP).

The above-described background relating to multi-TRP and CA is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
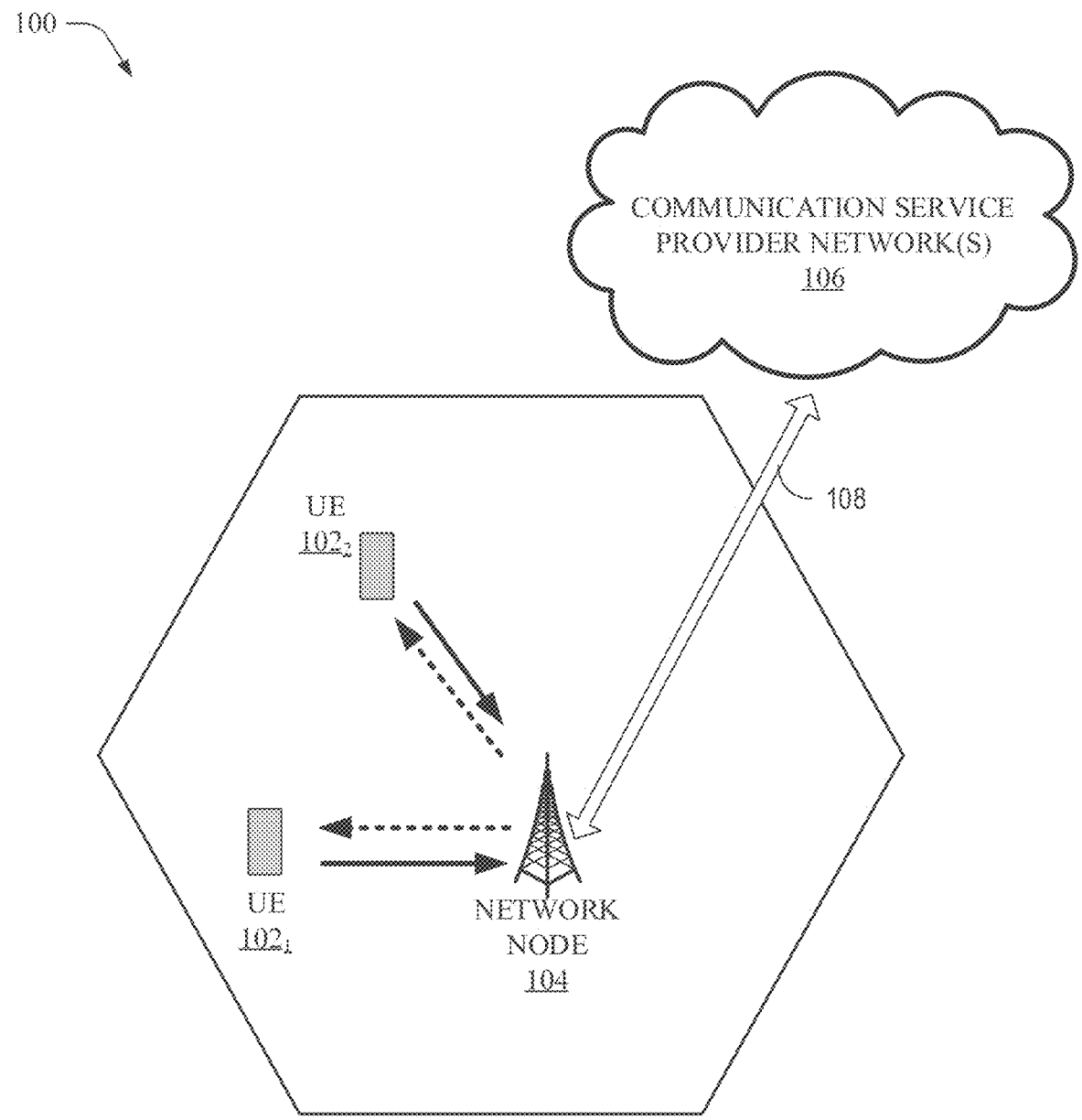
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate establishing a medium access control interface to coordinate communication between distribution units. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate establishing a medium access control interface to coordinate communication between distribution units. Facilitating establishing a medium access control interface to coordinate communication between distribution units can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

According an embodiment, a system can comprise a processor and a memory that stores executable instructions that, when executed by the processor, facilitate performance of operations comprising monitoring communication between a network node device and a communication device, wherein information is communicated by utilizing a first distribution unit node device comprising a first medium access control layer component of the network node device and receiving condition information representative of a condition, wherein the condition indicates whether to add a second distribution unit node device comprising a second medium access control layer component to be utilized by the communication device. The system can further facilitate in response to determining that the condition indicates addition of the second distribution unit node device, facilitating establishing a connection between the first medium access control layer component of the first distribution unit node device and the second medium access control layer component of the second distribution unit node device using a medium access control interface and facilitating communication of control plane information and user plane information between the first medium access control layer component and the second medium access control layer component using the medium access control interface.

According to another embodiment, described herein is a method that can comprise monitoring, by a device comprising a processor, communication between a network node device and a communication device, wherein information is communicated by utilizing a first distribution unit node device comprising a first medium access control layer component of the network node device. The method can further comprise receiving, by the device, a condition, wherein the condition indicates whether to add a second distribution unit node device comprising a second medium access control layer component to be utilized by the communication device. The method can further in response to determining that the condition indicates addition of the second distribution unit node device, facilitating, by the device, establishing a connection between the first medium access control layer component of the first distribution unit node device and the second medium access control layer component of the second distribution unit node device using a medium access control interface and initiating, by the device, communication of control plane information and user plane information between the first medium access control layer component and the second medium access control layer component using the medium access control interface.

According to yet another embodiment, a device can comprise a processor and a memory that stores executable instructions that, when executed by the processor, facilitate performance of operations comprising monitoring communication between a network node device and a communication device, wherein information is communicated by utilizing a first distribution unit node device of the network node device comprising a first medium access control layer component. The device can further comprise receiving a request to reconfigure radio resources, wherein the request to reconfigure the radio resources comprises utilizing a second distribution unit node device comprising a second medium access control layer component. The device can further comprise in response to the receiving the request to reconfigure the radio resources, facilitating establishing a connection between the first medium access control layer component of the first distribution unit node device and the second medium access control layer component of the second distribution unit node device using a medium access control interface and initiating communication of control plane information and user plane information between the first medium access control layer component and the second medium access control layer component using the medium access control interface.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment (UE) can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTP) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.)

supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
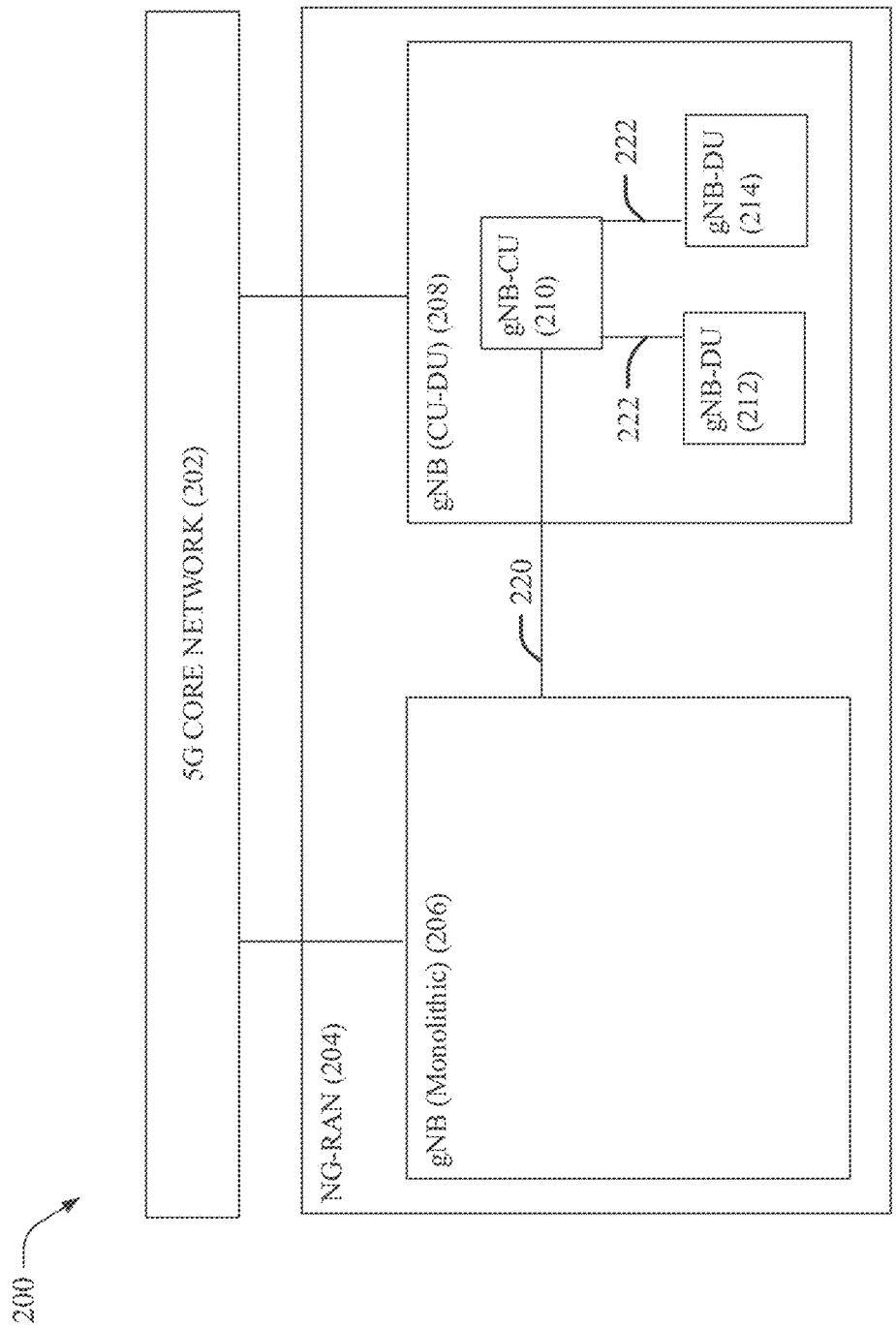
FIG. 2 illustrates a block diagram of an exemplary 5G network architecture.

FIG. 2 illustrates a block diagram of an exemplary 5G network architecture 200. For example, the network architecture 200 can comprise a core network 202 deploying a monolithic gNB 206 and/or a central unit (CU)-distributed unit (DU) split gNB 208 architecture, as part of a next generation radio access network (NG-RAN) 204. Currently, the gNB 206 and gNB 208 can communicate using a Xn-C interface 220. The monolithic gNB 206 comprises of user plane (UP) protocol functions such as service data adaptation protocol (SDAP), packet data convergence protocol (PDCP), radio link control (RLC), medium access control (MAC), and physical layer (PHY), and control plane (CP) functions such as radio resource control (RRC), PDCP, RLC, MAC and PHY (not shown). The gNB (CU-DU) 208 comprises gNB (CU) 210 which can be further split into gNB-CU-CP containing the CU functions RRC/PDCP and multiple gNB-CU-Ups containing user plane functions SDAP/PDCP. The gNB-DU 212 and gNB-DU 214 comprises protocol functions RLC/MAC/PHY. The gNB-DU 212 and gNB-DU 214 are communicatively connected to gNB-CU via F1 interface 222.

Figure 3A:
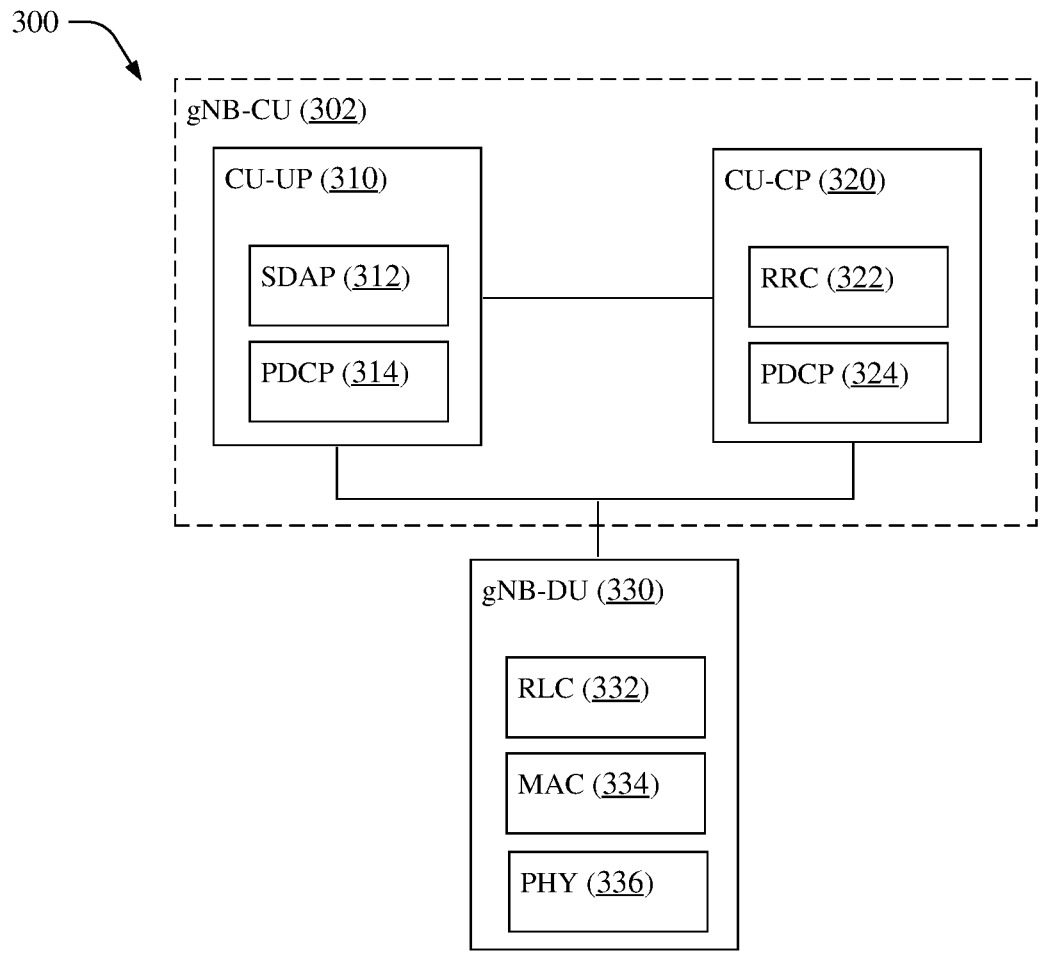
FIG. 3A illustrates an example of protocol functions for a gNB with CU-DU split architecture according to various aspects and embodiments described herein.

FIG. 3A illustrates an example of protocol functions for a gNB with CU-DU split architecture 300 according to various aspects and embodiments described herein. The CU-DU split architecture 300 can comprise gNB-CU 302 and a gNB-DU 330. The gNB-CU 302 can comprise a CU-UP 310 and CU-CP 320. The CU-UP 310 comprises user plane protocol functions such as SDAP 312 and PDCP 314. The CU-CP 320 comprises control plane protocol functions such as RRC 322 and PDCP 324. Correspondingly, the gNB-DU 330 comprises protocol functions such as RLC 332, MAC 334 and PHY 336. It should be noted that all the concepts discussed herein related to the gNB with CU-DU architecture can also be applied to the monolithic gNB architecture. This architecture allows for carrier aggregation across different component carriers that can be supported across two different non-co-located gNBs or gNB-DUs.

Figure 3B:
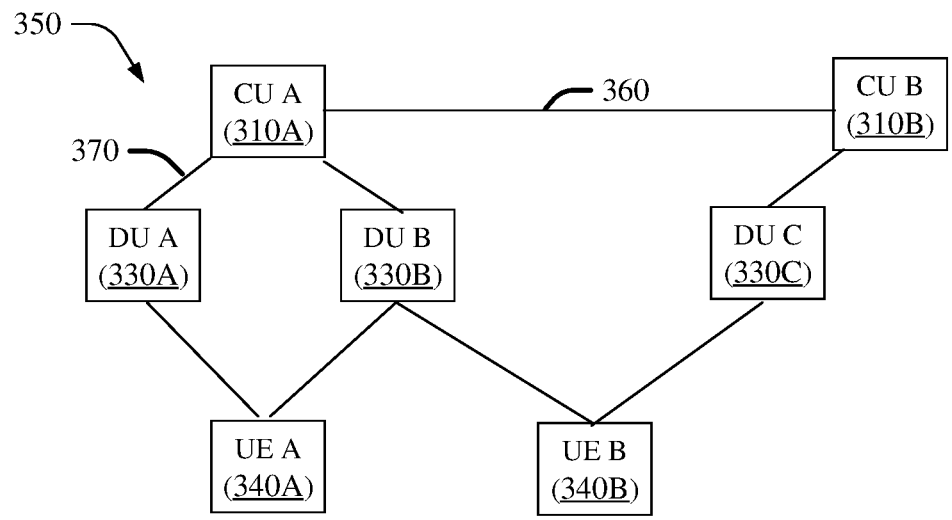
FIG. 3B illustrates an example of CU-DU split architecture according to various aspects and embodiments described herein.

FIG. 3B illustrates an example of CU-DU split architecture 350 according to various aspects and embodiments described herein. In the CU-DU split architecture 350, a CU A 310A can communicate with a UE via inter-DU architecture, wherein the transmission can occur using DU A 330A and DU B 330B that belong to the same CU A 310A. In some embodiments, two different non-co-located CUs (e.g., CU A 310A and CU B 310B) can communicate with UE B 340B using DUs from each respective CU (e.g., inter-CU). For example, transmission to UE B 340B can occur from the CU A 310A using DU B 330B and the CU B 310B using DU C 330C.

In some embodiments, multi-TRP transmission can be utilized to communicate with the UE. For example, in a multi-TRP with a single downlink control information (DCI) that provides UE with the necessary information such as physical layer resource allocation, power control commands, HARQ information for both uplink and downlink, a common MAC layer may perform joint scheduling between 2 TRPs. This may require the MAC to be located at a central location with very low latency transport to multiple TRPs to allow the MAC to jointly schedule transmission across multiple TRPs. In another example, in a multi-TRP with multi-DCI, each TRP may be scheduled independently by the same or separate MACs. This case allows non-ideal transport between the non-co-located TRPs. Note that independent scheduling for each TRP requires coordination across separate MAC entities corresponding to TRPs. Especially with non-ideal transport it is difficult to achieve such coordination in a time scale that still meets the transmission and signaling timelines required by wireless specifications.

In some embodiments, inter-DU/inter-CU CA can be used to communicate with the UE. Carrier aggregation typically assumes that a single MAC function is scheduling multiple aggregated component carriers. However, when carrier aggregation is performed across component carriers that originate from non-co-located TRPs, the performance of the system becomes quite sensitive to the transport latency between the two TRPs or DUs. This is because in the case of CA, all the uplink channel state information (CSI) reports and HARQ feedback corresponding to the small cell (SCell) carrier is first sent by the UE to a personal cell (PCell) carrier and then must be relayed over to the SCell. Especially when the transport between PCell and SCell is non-ideal there can be significant degradation in throughput performance experienced by the user.

An example for inter-DU/inter-CU CA, is CA across FR1 and FR2 carriers between a macro site and small cell site. Currently, the only reasonable solution for aggregating across macro and small cell sites for FR1 and FR2 respectively is to either use a cloud-RAN (CRAN) type of solution with ideal transport or to perform dual connectivity. CA-based solutions for such a scenario may have significant performance loss. Both CRAN-based solutions and DC-based solution have their own drawbacks. For example, CRAN-based solutions require very low latency high throughput transport, which can be cost prohibitive, and DC-based solutions provide aggregation at a much higher PDCP layer so they are not as responsive to dynamically changing channel conditions across different component carriers as a CA-based solution can be. Described herein a solution that enables inter-DU and inter-CU coordination between MAC entities that make it possible to more easily implement use cases such as inter-site CA and inter-site multi-TRP transmission.

In some embodiments, a new logical interface, which we call the $X_{mac}$ interface, between peer MAC entities at non-co-located gNB-DUs (distributed unit and centralized unit (CU)) is utilized to enable inter-DU and inter-CU coordination between MAC entities that make it possible to more easily implement use cases such as inter-site CA and inter-site multi-TRP transmission. This $X_{mac}$ interface enables communication of control and user plane information between peer MACs for coordination for inter-site CA or inter-site multi-TRP operation. The $X_{mac}$ interface may consist of a control plane part, $X_{mac}$-C, and user plane part, $X_{mac}$-U. When configured to operate in inter-site mode, the MAC at one of the DUs (for example, the DU that hosts the PCell), is designated as the primary MAC, and the MACs at other DUs in inter-site operation are designated as secondary MACs. In some embodiments, the MAC layer may be split into a higher MAC (MAC-H) and lower MAC (MAC-L), where the MAC-H at the primary is in control of the MAC-Ls residing at all the DUs corresponding to all the secondary MACs. Also, the $X_{mac}$ interface may be used to enable inter-site CA or inter-site multi-TRP operation across multiple sites.

The advantage of the described solution are that direct MAC-to-MAC enables coordination between peer DUs that are either under the same CU or under different CUs; enables inter-site CA without requiring a centralized MAC and very low latency high throughput transport between DUs; enables inter-site multi-TRP transmission with multi-DCI across non-co-located DUs; and inter-site CA solutions via a MAC-MAC interface can be enabled across more than two sites because it is still a CA-based solution, so it requires the UEs to transmit only on a single PCell uplink.

Figure 4A:
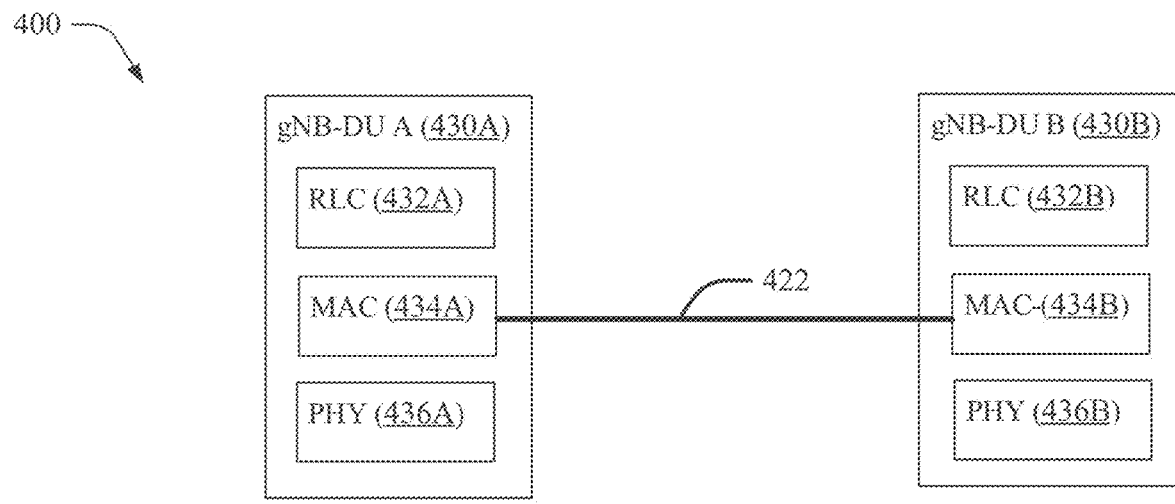
FIG. 4A illustrates a block diagram of an example, non-limiting system that facilitates establishing a medium access control interface to coordinate communication between distribution units in accordance with one or more embodiments described herein.

FIG. 4A illustrates a block diagram of an example, non-limiting system 400 that facilitates establishing a medium access control interface to coordinate communication between distribution units in accordance with one or more embodiments described herein. The system 400 comprises a gNB-DU A 430A and gNB-DU 430B, wherein the gNB-DU A comprises a RLC 432A, MAC 434A and PHY 436A, and the gNB-DU B comprises a RLC 432B, MAC 434B and PHY 436B. In some embodiments, a $X_{mac}$ interface 422 that facilitates communication between two MAC layers (MAC 434A and MAC 434B) is provided. The interface 422 allows direct coordination MAC entities of non-co-located DUs. Such a MAC-MAC interface can carry control signaling for coordination between peer MAC entities, and also carry user plane traffic from one MAC to another MAC. The $X_{mac}$ interface 422 is defined as a logical interface. Physically this interface may be carried in different ways between two the MACs, for example, via a direct fiber connection between DUs, or via a wireless connection between DUs, or tunneled through another interface.

In some embodiments, the MAC at one DU (e.g., 434A) is designated as the primary MAC, while the MAC at the peer DU (e.g., 434B) is designated as the secondary MAC. For example, in the case of inter-site CA, the MAC associated with the PCell carrier is designated as the primary MAC, while the MAC associated with a SCell carrier is designated as the secondary MAC. In some embodiments, the primary MAC (e.g., 434A) controls of the secondary MAC (e.g., 434B) via the $X_{mac}$ interface 422.

In some embodiments, the $X_{mac}$ interface 422 comprises two parts, a control plane ($X_{mac}$-C interface) and user plane (e.g., $X_{mac}$-U interface). The control plane part, $X_{mac}$-C, may use control plane messages with various information elements to allow exchange of coordination information between peer MAC entities. In the case of multi-TRP operation with multi-DCI, the inter-MAC coordination information, may include UE-reported CSI and rank, spatial layers, DCI configuration, PDSCH configuration, HARQ processes, etc. In the case of inter-site CA use case, the $X_{mac}$-C may relay CSI feedback and HARQ feedback information from the PCell MAC to SCell MAC. In addition, the $X_{mac}$-C could relay information from the SCell back to the PCell related to buffer status or throughput.

The user plane part, $X_{mac}$-U, may be used to transfer user plane data in the form of RLC PDUs from the primary MAC to a secondary MAC. Additionally, there may need to be some form of flow control between the primary MAC and secondary MAC, in order to ensure proper flow of data and to prevent wastage of resources on component carriers.

Figure 4B:
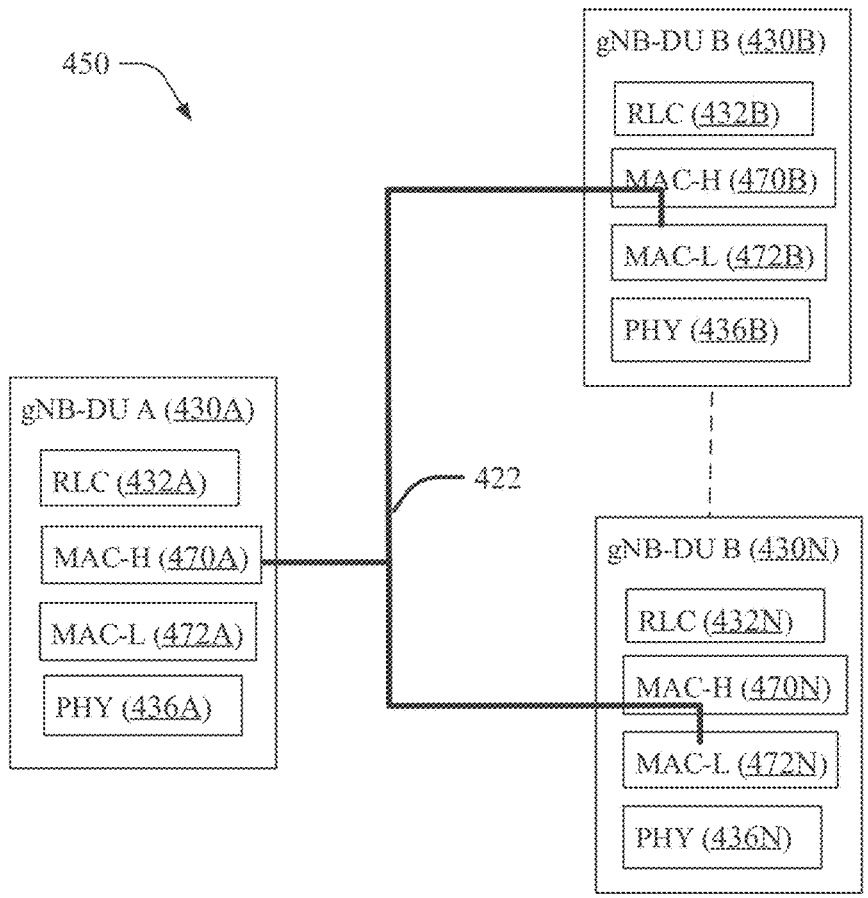
FIG. 4B illustrates a block diagram of an example, non-limiting system that facilitates establishing a medium access control interface to coordinate communication between distribution units in accordance with one or more embodiments described herein.

FIG. 4B illustrates a block diagram of an example, non-limiting system 450 that facilitates establishing a medium access control interface to coordinate communication between distribution units in accordance with one or more embodiments described herein. In some embodiments, the MAC 434A FIG. 4A functions can be split between a higher MAC-H 470A and a lower MAC-L 472A. At the MAC of the primary DU (e.g., gNB-DU A 430A), the MAC-H is fully instantiated. However, at the MACs for the secondary (e.g., gNB-DUs 430B through 430N), the MAC-H (e.g., 470B through 470N) is in passive mode. The MAC-L at each DU operates independently of other MAC-Ls. On the primary side, the MAC-L simply communicates with the MAC-H above.

In some embodiments, the MAC-L is unaware of whether the MAC-H above it is in active mode or passive mode. When the MAC-H is in active mode, for example, at the primary MAC (e.g., MAC-H 472A) at PCell DU, the MAC-L (e.g., MAC-L 472A) is directly controlled by the MAC-H 472A above it. However, when the MAC-H (e.g., MAC-H 470B through 470N) is in passive mode, for example, at the secondary MAC (gNB-DUs 430B through 430N), the MAC-L 472B through 472N are indirectly controlled by the MAC-H 470A residing at the primary MAC (gNB-DUs 430A). In this case, when the passive MAC-H (e.g., 472B) at the secondary MAC receives control or user plane information from the active MAC-H (e.g., 472A) at the primary MAC (gNB-DUs 430A), and the passive MAC-H (e.g. 470B) simply translates the received information in order to pass down the required information to control the MAC-L (e.g., 472B). This allows the MAC-L (e.g., 472B) to be designed to receive information from the MAC-H (e.g., 470B) above it without being aware of whether it is being controlled by the local MAC-H (e.g., 470A) or a remote MAC-H (e.g., 470B). The MAC-L (e.g., 472A) also does not have to be aware of the $X_{mac}$ interface. Such a framework allows highly flexible MAC configuration to individually operate each bearer in either intra-site or inter-site mode.

In some embodiments, the functions residing at the MAC-H (e.g., 470A) may include upper level MAC/scheduler functions such as user selection, scheduling metric calculations, QoS considerations, flow control over $X_{mac}$ interface etc. In such an embodiment the corresponding functions residing at the MAC-L (e.g., 470B) may include lower MAC/scheduler functions such as resource allocation, HARQ processing, etc. The various embodiments herein do not preclude other embodiments with other ways of splitting functions between MAC-H and MAC-L.

In some embodiments, the procedure that is used by the CU-CP to set up aggregation with a new carrier is called RRC reconfiguration. When the CU-CP triggers the RRC reconfiguration to add a new carrier (called secondary cell or SCell) belonging to a non-co-located DU for a UE, this could trigger the establishment of the $X_{mac}$ interface between the two DUs for that particular UE. In general, as long as there is at least one UE operating in inter-site TRP or inter-site CA mode between two DUs, there would be an established $X_{mac}$ interface between those two DUs.

Figure 5:
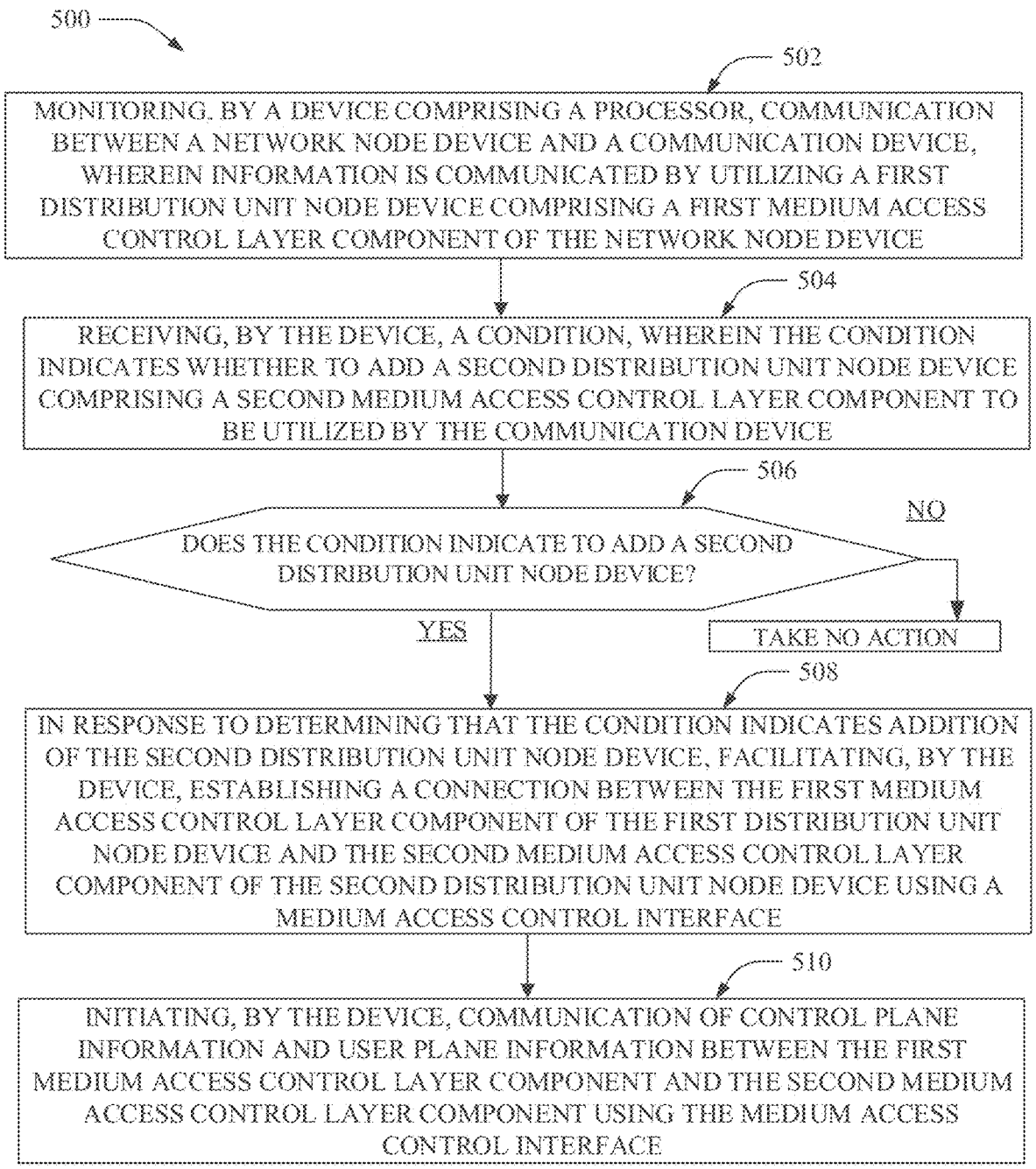
FIG. 5 depicts a diagram of an example, non-limiting computer implemented method that facilitates establishing a medium access control interface to coordinate communication between distribution units in accordance with one or more embodiments described herein.

FIG. 5 depicts a diagram of an example, non-limiting computer implemented method that facilitates establishing a medium access control interface to coordinate communication between distribution units in accordance with one or more embodiments described herein. In some examples, flow diagram 500 can be implemented by operating environment 900 described below. It can be appreciated that the operations of flow diagram 500 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts monitoring, by a device comprising a processor, communication between a network node device and a communication device, wherein information is communicated by utilizing a first distribution unit node device comprising a first medium access control layer component of the network node device. Operation 504 depicts receiving, by the device, a condition, wherein the condition indicates whether to add a second distribution unit node device comprising a second medium access control layer component to be utilized by the communication device (e.g., when the CU-CP triggers the RRC reconfiguration to add a new carrier belonging to a non-co-located DU for a UE, this could trigger the establishment of the $X_{mac}$ interface between the two DUs for that particular UE). Operation 506 depicts, if the condition indicates to add a second distribution unit node device, perform operation 508. Otherwise, continue monitoring. Operation 508 depicts in response to determining that the condition indicates addition of the second distribution unit node device, facilitating, by the device, establishing a connection between the first medium access control layer component of the first distribution unit node device and the second medium access control layer component of the second distribution unit node device using a medium access control interface. Operation 510 depicts initiating, by the device, communication of control plane information and user plane information between the first medium access control layer component and the second medium access control layer component using the medium access control interface.

Figure 6:
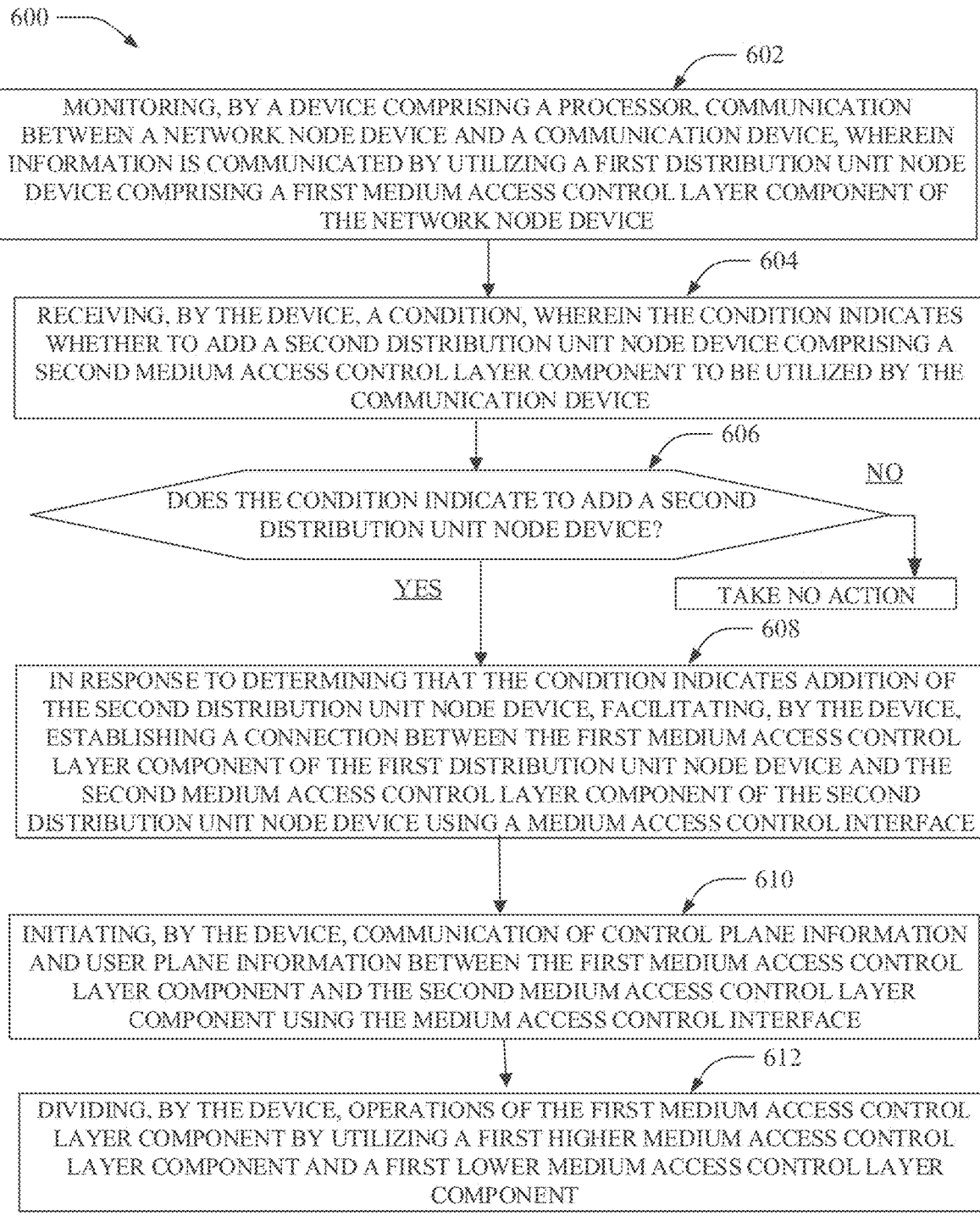
FIG. 6 depicts a diagram of an example, non-limiting computer implemented method that facilitates establishing a medium access control interface to coordinate communication between distribution units in accordance with one or more embodiments described herein.

FIG. 6 depicts a diagram of an example, non-limiting computer implemented method that facilitates establishing a medium access control interface to coordinate communication between distribution units in accordance with one or more embodiments described herein. In some examples, flow diagram 600 can be implemented by operating environment 900 described below. It can be appreciated that the operations of flow diagram 600 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts monitoring, by a device comprising a processor, communication between a network node device and a communication device, wherein information is communicated by utilizing a first distribution unit node device comprising a first medium access control layer component of the network node device. Operation 604 depicts receiving, by the device, a condition, wherein the condition indicates whether to add a second distribution unit node device comprising a second medium access control layer component to be utilized by the communication device (e.g., when the CU-CP triggers the RRC reconfiguration to add a new carrier belonging to a non-co-located DU for a UE, this could trigger the establishment of the $X_{mac}$ interface between the two DUs for that particular UE). Operation 606 depicts, if the condition indicates to add a second distribution unit node device, perform operation 608. Otherwise, continue monitoring. Operation 608 depicts in response to determining that the condition indicates addition of the second distribution unit node device, facilitating, by the device, establishing a connection between the first medium access control layer component of the first distribution unit node device and the second medium access control layer component of the second distribution unit node device using a medium access control interface. Operation 610 depicts initiating, by the device, communication of control plane information and user plane information between the first medium access control layer component and the second medium access control layer component using the medium access control interface. Operation 612 depicts dividing, by the device, operations of the first medium access control layer component by utilizing a first higher medium access control layer component and a first lower medium access control layer component.

Figure 7:
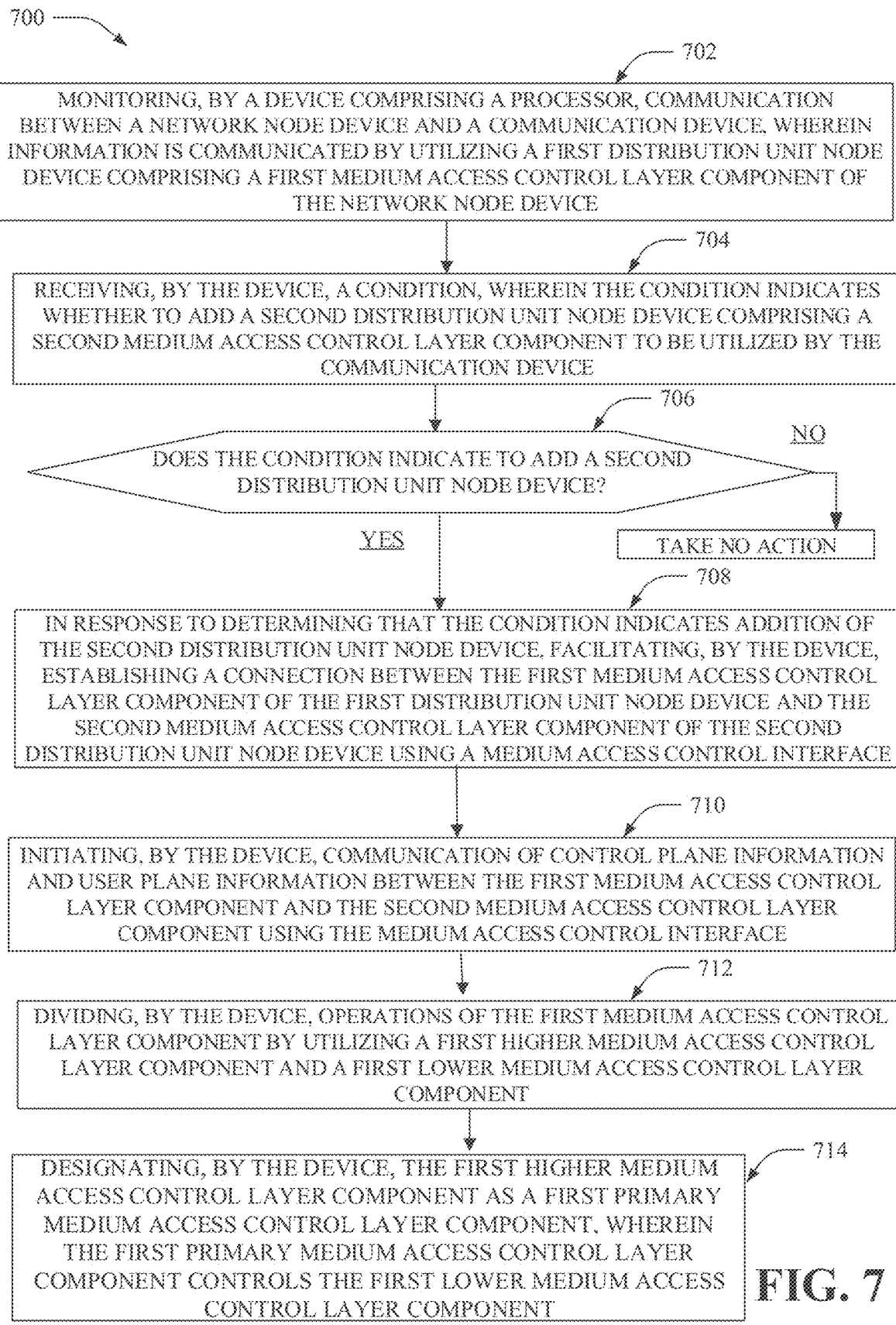
FIG. 7 depicts a diagram of an example, non-limiting computer implemented method that facilitates establishing a medium access control interface to coordinate communication between distribution units in accordance with one or more embodiments described herein.

FIG. 7 depicts a diagram of an example, non-limiting computer implemented method that facilitates establishing a medium access control interface to coordinate communication between distribution units in accordance with one or more embodiments described herein. In some examples, flow diagram 700 can be implemented by operating environment 900 described below. It can be appreciated that the operations of flow diagram 700 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts monitoring, by a device comprising a processor, communication between a network node device and a communication device, wherein information is communicated by utilizing a first distribution unit node device comprising a first medium access control layer component of the network node device. Operation 704 depicts receiving, by the device, a condition, wherein the condition indicates whether to add a second distribution unit node device comprising a second medium access control layer component to be utilized by the communication device (e.g., when the CU-CP triggers the RRC reconfiguration to add a new carrier belonging to a non-co-located DU for a UE, this could trigger the establishment of the $X_{mac}$ interface between the two DUs for that particular UE). Operation 706 depicts, if the condition indicates to add a second distribution unit node device, perform operation 708. Otherwise, continue monitoring. Operation 708 depicts in response to determining that the condition indicates addition of the second distribution unit node device, facilitating, by the device, establishing a connection between the first medium access control layer component of the first distribution unit node device and the second medium access control layer component of the second distribution unit node device using a medium access control interface. Operation 710 depicts initiating, by the device, communication of control plane information and user plane information between the first medium access control layer component and the second medium access control layer component using the medium access control interface. Operation 712 depicts dividing, by the device, operations of the first medium access control layer component by utilizing a first higher medium access control layer component and a first lower medium access control layer component. Operation 714 depicts designating, by the device, the first higher medium access control layer component as a first primary medium access control layer component, wherein the first primary medium access control layer component controls the first lower medium access control layer component.

Figure 8:
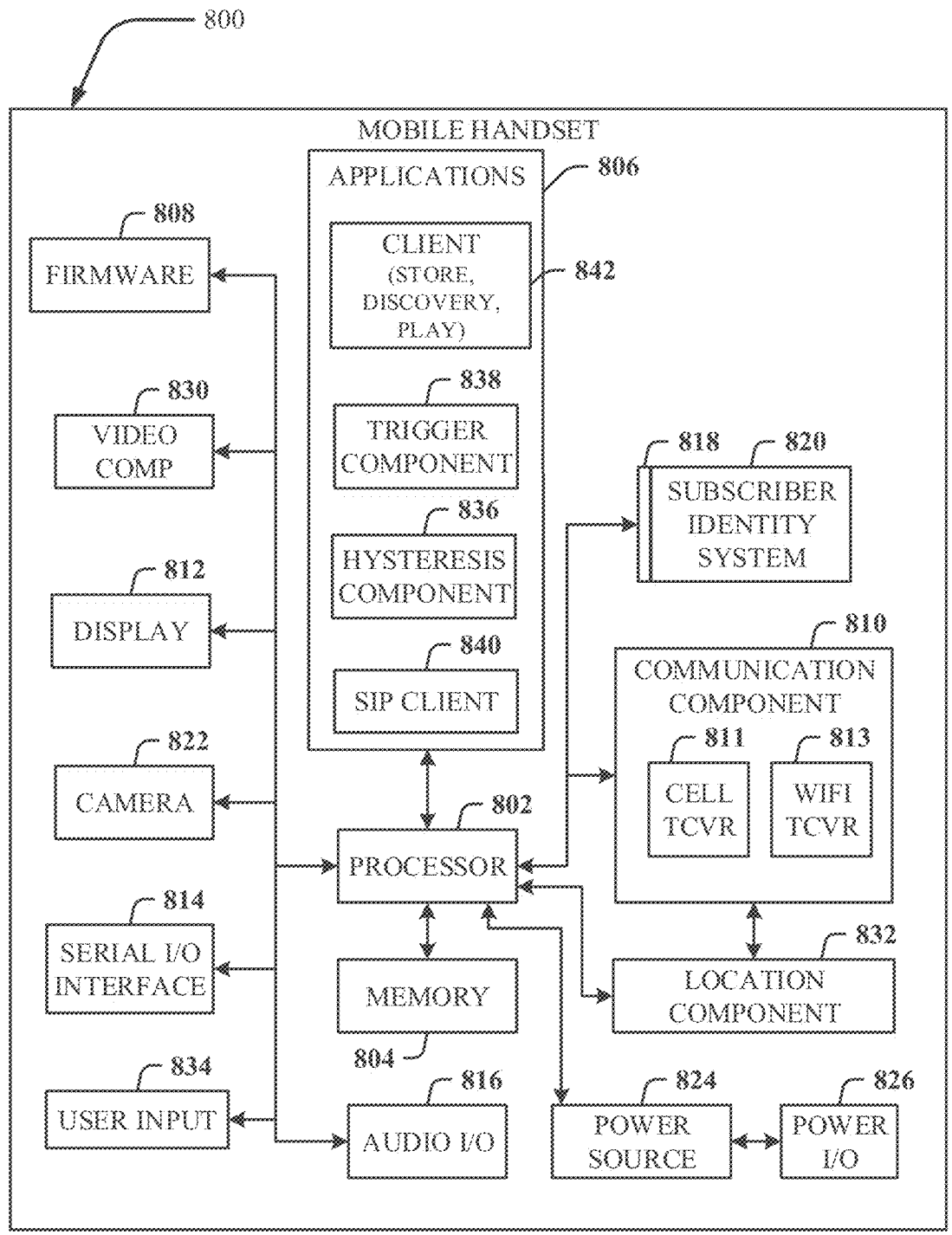
FIG. 8 illustrates an example block diagram of an example mobile handset operable to engage in a system architecture that facilitates wireless communications according to one or more embodiments described herein.

Referring now to FIG. 8, illustrated is an example block diagram of an example mobile handset 800 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808 and executed by the processor 802 from either or both the memory 804 or/and the firmware 808. The firmware 808 can also store startup code for execution in initializing the handset 800. A communications component 810 interfaces to the processor 802 to facilitate wired/wireless communication with external systems, e.g., cellular networks, VoIP networks, and so on. Here, the communications component 810 can also include a suitable cellular transceiver 811 (e.g., a GSM transceiver) and/or an unlicensed transceiver 813 (e.g., Wi-Fi, WiMax) for corresponding signal communications. The handset 800 can be a device such as a cellular telephone, a PDA with mobile communications capabilities, and messaging-centric devices. The communications component 810 also facilitates communications reception from terrestrial radio networks (e.g., broadcast), digital satellite radio networks, and Internet-based radio services networks.

The handset 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 894) through a hardwire connection, and other serial input devices (e.g., a keyboard, keypad, and mouse). This can support updating and troubleshooting the handset 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The handset 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the handset 800, and updated by downloading data and software.

The handset 800 can process IP data traffic through the communications component 810 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 822 (e.g., a camera) can be provided for decoding encoded multimedia content. The video processing component 822 can aid in facilitating the generation, editing, and sharing of video quotes. The handset 800 also includes a power source 824 in the form of batteries and/or an AC power subsystem, which power source 824 can interface to an external power system or charging equipment (not shown) by a power I/O component 826.

The handset 800 can also include a video component 830 for processing video content received and, for recording and transmitting video content. For example, the video component 830 can facilitate the generation, editing and sharing of video quotes. A location tracking component 832 facilitates geographically locating the handset 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touchscreen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the handset 800 to support SIP protocols and register the subscriber with the SIP registrar server. The applications 806 can also include a client 842 that provides at least the capability of discovery, play and store of multimedia content, for example, music.

The handset 800, as indicated above related to the communications component 810, includes an indoor network radio transceiver 813 (e.g., Wi-Fi transceiver). This function supports the indoor radio link, such as IEEE-802.11, for the dual-mode GSM handset 800. The handset 800 can accommodate at least satellite radio services through a handset that can combine wireless voice and digital radio chipsets into a single handheld device.

Figure 9:
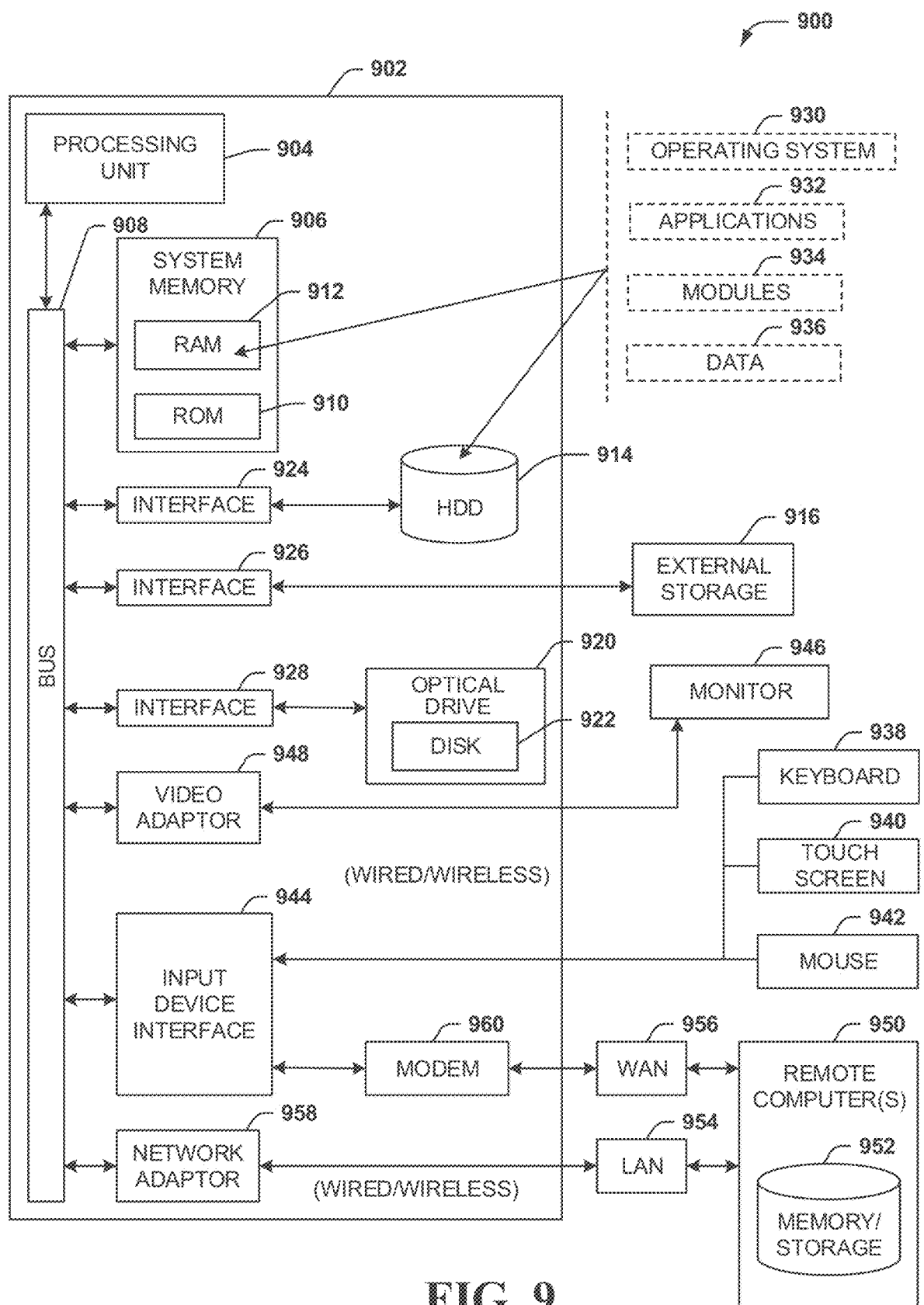
FIG. 9 illustrates an example block diagram of an example computer operable to engage in a system architecture that facilitates secure wireless communication according to one or more embodiments described herein.

Referring now to FIG. 9, illustrated is an example block diagram of an example computer 900 operable to engage in a system architecture that facilitates wireless communications according to one or more embodiments described herein. The computer 900 can provide networking and communication capabilities between a wired or wireless communication network and a server and/or communication device.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR)

remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
monitoring communication between a network node device and a communication device, wherein information is communicated by utilizing a first distribution unit node device comprising a first medium access control layer component of the network node device;
receiving condition information representative of a condition, wherein the condition indicates whether to add a second distribution unit node device comprising a second medium access control layer component to be utilized by the communication device;
in response to determining that the condition indicates addition of the second distribution unit node device, facilitating establishing a connection between the first medium access control layer component of the first distribution unit node device and the second medium access control layer component of the second distribution unit node device using a medium access control interface; and
facilitating communication of control plane information and user plane information between the first medium access control layer component and the second medium access control layer component using the medium access control interface.

2. The system of claim 1, wherein the network node device is a first network node device comprising the first distribution unit node device and the second distribution unit node device.

3. The system of claim 1,
wherein the network node device is a first network node device comprising the first distribution unit node device; and
wherein the establishing the connection between the first medium access control layer component of the first distribution unit node device and the second medium access control layer component of the second distribution unit node device comprises establishing connection between a second network node device and the communication device, wherein the second network node device comprises the second distribution unit node device.

4. The system of claim 1,
wherein the first medium access control layer component of the first distribution unit node device comprises a first primary medium access control layer component and a first secondary medium access control layer component; and
wherein the second medium access control layer component of the second distribution unit node device comprises a second primary medium access control layer component and a second secondary medium access control layer component.

5. The system of claim 4, wherein the facilitating the communication of the control plane information and the user plane information between the first medium access control layer component and the second medium access control layer component comprises utilizing the first primary medium access control layer component of the first distribution unit node device and the second secondary medium access control layer component of the second distribution unit node device.

6. The system of claim 1, wherein the operations further comprise:
dividing logic operations of the first medium access control layer component by utilizing a first higher medium access control layer component and a first lower medium access control layer component.

7. The system of claim 6, wherein the operations further comprise:
designating the first higher medium access control layer component as a first primary medium access control layer component, wherein the first primary medium access control layer component controls the first lower medium access control layer component.

8. A method, comprising:
monitoring, by a device comprising a processor, communication between a network node device and a communication device, wherein information is communicated by utilizing a first distribution unit node device comprising a first medium access control layer component of the network node device;
receiving, by the device, a condition, wherein the condition indicates whether to add a second distribution unit node device comprising a second medium access control layer component to be utilized by the communication device;
in response to determining that the condition indicates addition of the second distribution unit node device, facilitating, by the device, establishing a connection between the first medium access control layer component of the first distribution unit node device and the second medium access control layer component of the second distribution unit node device using a medium access control interface; and
initiating, by the device, communication of control plane information and user plane information between the first medium access control layer component and the second medium access control layer component using the medium access control interface.

9. The method of claim 8, wherein the network node device is a first network node device comprising the first distribution unit node device and the second distribution unit node device.

10. The method of claim 8,
wherein the network node device is a first network node device comprising the first distribution unit node device; and
wherein the establishing the connection between the first medium access control layer component of the first distribution unit node device and the second medium access control layer component of the second distribution unit node device comprises establishing connection between a second network node device and the communication device, wherein the second network node device comprises the second distribution unit node device.

11. The method of claim 8,
wherein the first medium access control layer component of the first distribution unit node device comprises a first primary medium access control layer component and a first secondary medium access control layer component; and
wherein the second medium access control layer component of the second distribution unit node device comprises a second primary medium access control layer component and a second secondary medium access control layer component.

12. The method of claim 11, wherein the initiating the communication of the control plane information and the user plane information between the first medium access control layer component and the second medium access control layer component comprises utilizing the first primary medium access control layer component of the first distribution unit node device and the second secondary medium access control layer component of the second distribution unit node device.

13. The method of claim 8, further comprising:
dividing, by the device, operations of the first medium access control layer component by utilizing a first higher medium access control layer component and a first lower medium access control layer component.

14. The method of claim 13, further comprising:
designating, by the device, the first higher medium access control layer component as a first primary medium access control layer component, wherein the first primary medium access control layer component controls the first lower medium access control layer component.

15. A non-transitory machine-readable medium, comprising executable instructions that, when executed by a processor, facilitate performance of operations, comprising:
monitoring communication between a network node device and a communication device, wherein information is communicated by utilizing a first distribution unit node device of the network node device comprising a first medium access control layer component;
receiving a request to reconfigure radio resources, wherein the request to reconfigure the radio resources comprises utilizing a second distribution unit node device comprising a second medium access control layer component;
in response to the receiving the request to reconfigure the radio resources, facilitating establishing a connection between the first medium access control layer component of the first distribution unit node device and the second medium access control layer component of the second distribution unit node device using a medium access control interface; and
initiating communication of control plane information and user plane information between the first medium access control layer component and the second medium access control layer component using the medium access control interface.

16. The non-transitory machine-readable medium of claim 15, wherein the network node device is a first network node device comprising the first distribution unit node device and the second distribution unit node device.

17. The non-transitory machine-readable medium of claim 15,
wherein the network node device is a first network node device comprising the first distribution unit node device; and
wherein the establishing the connection between the first medium access control layer component of the first distribution unit node device and the second medium access control layer component of the second distribution unit node device comprises establishing connection between a second network node device and the communication device, wherein the second network node device comprises the second distribution unit node device.

18. The non-transitory machine-readable medium of claim 15,
wherein the first medium access control layer component of the first distribution unit node device comprises a first primary medium access control layer component and a first secondary medium access control layer component; and
wherein the second medium access control layer component of the second distribution unit node device comprises a second primary medium access control layer component and a second secondary medium access control layer component.

19. The non-transitory machine-readable medium of claim 18, wherein the initiating the communication of the control plane information and the user plane information between the first medium access control layer component and the second medium access control layer component comprises utilizing the first primary medium access control layer component of the first distribution unit node device and the second secondary medium access control layer component of the second distribution unit node device.

20. The non-transitory machine-readable medium of claim 15, wherein the operations further comprise:
dividing logic operations of the first medium access control layer component by utilizing a first higher medium access control layer component and a first lower medium access control layer component.

* * * * *